United States Patent [19]

Brunson, IV et al.

[11] Patent Number: 5,251,480
[45] Date of Patent: Oct. 12, 1993

[54] FROST-PROOF DRIVE SHAFT FOR WATER METER

[75] Inventors: Charles P. Brunson, IV, Montgomery; Thierry Swinson, Wetumpka, both of Ala.

[73] Assignee: Schlumberger Industries, Inc.

[21] Appl. No.: 892,291

[22] Filed: Jun. 2, 1992

[51] Int. Cl.[5] .............................................. G01F 15/10
[52] U.S. Cl. ........................................ 73/253; 73/258; 73/277
[58] Field of Search .................... 73/258, 253, 277, 273

[56] References Cited

U.S. PATENT DOCUMENTS

| | | | |
|---|---|---|---|
| 620,791 | 3/1899 | Meincke | 73/277 |
| 2,159,892 | 5/1939 | Hanks | 73/277 |
| 3,802,266 | 4/1974 | Rittenhouse et al. | 73/258 |

Primary Examiner—Richard E. Chilcot, Jr.
Assistant Examiner—Harshad Patel
Attorney, Agent, or Firm—D. V. Gaudier

[57] ABSTRACT

An improved drive shaft for a positive displacement type water meter includes a flexible spring arm formed on one end of the shaft for engaging the drive spindle of a nutating disk measuring element disposed within a water meter. The other end of the drive shaft is connected to a magnetic drive which, in turn, is magnetically coupled to a conventional mechanical register. Under normal conditions, the nutating disk measuring element and drive spindle oscillate in the water meter at a rate proportional to water meter flow. The drive spindle engages the spring arm of the drive shaft causing the drive shaft and magnet to rotate. The magnet is coupled through the water meter casing to a second magnet in the register. Rotation of the second magnet is used to drive the mechanical register to register water consumption. In the event the first magnet within the meter casing becomes frozen to the casing because of external freezing conditions, the drive spindle will snap past the flexible spring arm. This prevents damage to the drive shaft and first magnet which would otherwise occur with conventional drive shaft arrangements.

12 Claims, 3 Drawing Sheets

FROST-PROOF DRIVE SHAFT FOR WATER METER

BACKGROUND OF THE INVENTION

1. Field of the Invention

The invention relates to water meters and, more particularly, to an improved drive shaft for water meters which prevents damage to meter components in case one or more components are unable to move due to freezing conditions.

2. Description of the Prior Art

Conventional water meters of the positive-displacement type are used to measure the volume (in gallons or other units) of water consumed by a user, Because users are billed on their consumption, such meters must be highly accurate and operate over a wide range of temperatures and environmental conditions.

Such meters generally include an outer casing or housing formed from a non-ferrous metal, such as bronze, having an inlet and an outlet. Within the meter casing is disposed a measuring chamber which may be formed from a plastic or similar material. The measuring chamber defines a precise and predetermined volume. Disposed within the chamber is a so-called nutating disk or oscillating piston which divides the chamber into two or more portions. A drive spindle is attached at right angles to the center of the nutating disk or oscillating piston. As water flows from the meter inlet, through the measuring chamber and through the meter outlet, it causes the nutating disk or oscillating piston to nutate or oscillate within the measuring chamber. This, in turn, causes the free end of the drive spindle to move through a circular path.

This oscillatory motion of the drive spindle is translated into rotational motion of a drive shaft by means of a rigid arm or arms which engage the free end of the drive spindle. Mounted to the other end of the drive shaft is a circular magnet whose surface is disposed immediately adjacent, but not in contact with, an inner portion of the non-ferrous outer casing of the meter.

Mounted atop the meter is a register for displaying water consumption. This register may be a mechanical display of the dial and pointer and/or odometer wheel type. The mechanical components of the register are coupled to the magnet disposed on the end of the drive shaft by means of a second magnet attached to the register drive shaft and disposed adjacent the bottom portion of the register assembly in such a fashion so that when the register is mounted to the top of the meter casing, the two magnets are magnetically coupled together. Such arrangements are shown, for example, in U.S. Pat. No. 3,002,266 and in product literature published by Schlumberger Industries, Inc. for the Neptunes ® T-10 model water meter.

One problem associated with these conventional register driving mechanisms for water meters is that water is always present in the narrow area between the face of the circular magnet connected to the meter drive shaft and the inside surface of the meter casing. If the meter casing is subjected to freezing conditions, it is possible for a layer of frost or ice to form between the circular magnet and the inside of the meter casing. Under these circumstances, the circular magnet and its associated drive shaft will be "frozen" (i.e. unable to move). However, water in the main line leading to and away from the meter, along with water within the meter's measuring chamber, may not be frozen. Under these circumstances, when a user turns on his faucet or otherwise begins to draw water through the meter, the water pressure on the nutating disk or piston will cause it to begin to nutate or oscillate. If sufficient pressure is applied, the end of the drive spindle may simply snap off the rigid arm formed on the end of the drive shaft. Once the water between the circular magnet and the facing portion of the outer casing thaws, the drive shaft will no longer turn the circular magnet, thus causing loss of registration of water flowing through the water meter. This breakdown will probably not be discovered until the next time the water meter is read by the utility, which may occur only several months later. This results in substantial loss of revenue to the water utility, not to mention the need to shut down the user's water service while the broken meter is being taken out of service and repaired.

A conventional water meter drive shaft may also fail under similar conditions by a slightly different mechanism. If the arm on the end of the drive shaft which engages the drive spindle does not break, the drive shaft itself may twist and snap or the connection between the other end of the drive shaft and the circular magnet may be broken. This connection is normally a tight press-fit of the drive shaft into an opening formed in the center of the circular magnet. If too much pressure is applied to this connection the area of the drive shaft which is press fitted into the circular magnet may strip or the magnet itself may break because of the applied forces.

It would therefore be of great benefit if a conventional drive shaft for a water meter could be improved to eliminate the possibility that the arm which engages the drive spindle could be broken and remove the possibility that forces beyond a predetermined level could be applied to the drive shaft and the connection of the drive shaft to the circular magnet, especially when the meter is subjected to freezing conditions.

SUMMARY OF THE INVENTION

The present invention meets the foregoing needs and overcomes the drawbacks of the prior art. The invention comprises an improved drive shaft for a water meter of the type having an oscillatory positive displacement measuring element disposed in a chamber, the measuring element including a drive spindle coupled to means for magnetically driving a register. In particular, the drive shaft includes a first end having a flexible portion extending radially away from a longitudinal axis of the drive shaft. The other end of the drive shaft is connected to the magnetic drive means. The drive spindle of the measuring element engages the flexible portion of the drive shaft to turn the drive shaft and magnetic drive means when the measuring element and drive spindle oscillate due to the passage of water through the chamber formed within a water meter casing.

In a preferred embodiment, the flexible portion of the drive shaft comprises a spiral spring arm having a protrusion formed at one end of the arm. This arrangement prevents slippage of the drive spindle past the protrusion formed on the flexible portion of the spring arm, except when the force applied by the drive spindle to the flexible portion exceeds a predetermined value. Thus, even if the magnetic drive means is frozen or otherwise immobilized, the drive spindle will snap past the end of the flexible portion of the drive shaft. This arrangement prevents breakage of the drive shaft and- /or magnetic drive means. The drive shaft and flexible arm may be formed from a single piece of plastic material.

BRIEF DESCRIPTION OF THE DRAWING FIGURES

These and other features and advantages of the present invention are described in more detail in the following description of the preferred embodiment when taken in conjunction with the accompanying drawing figures wherein.

DETAILED DESCRIPTION OF THE PREFERRED EMBODIMENT

Figure 1:
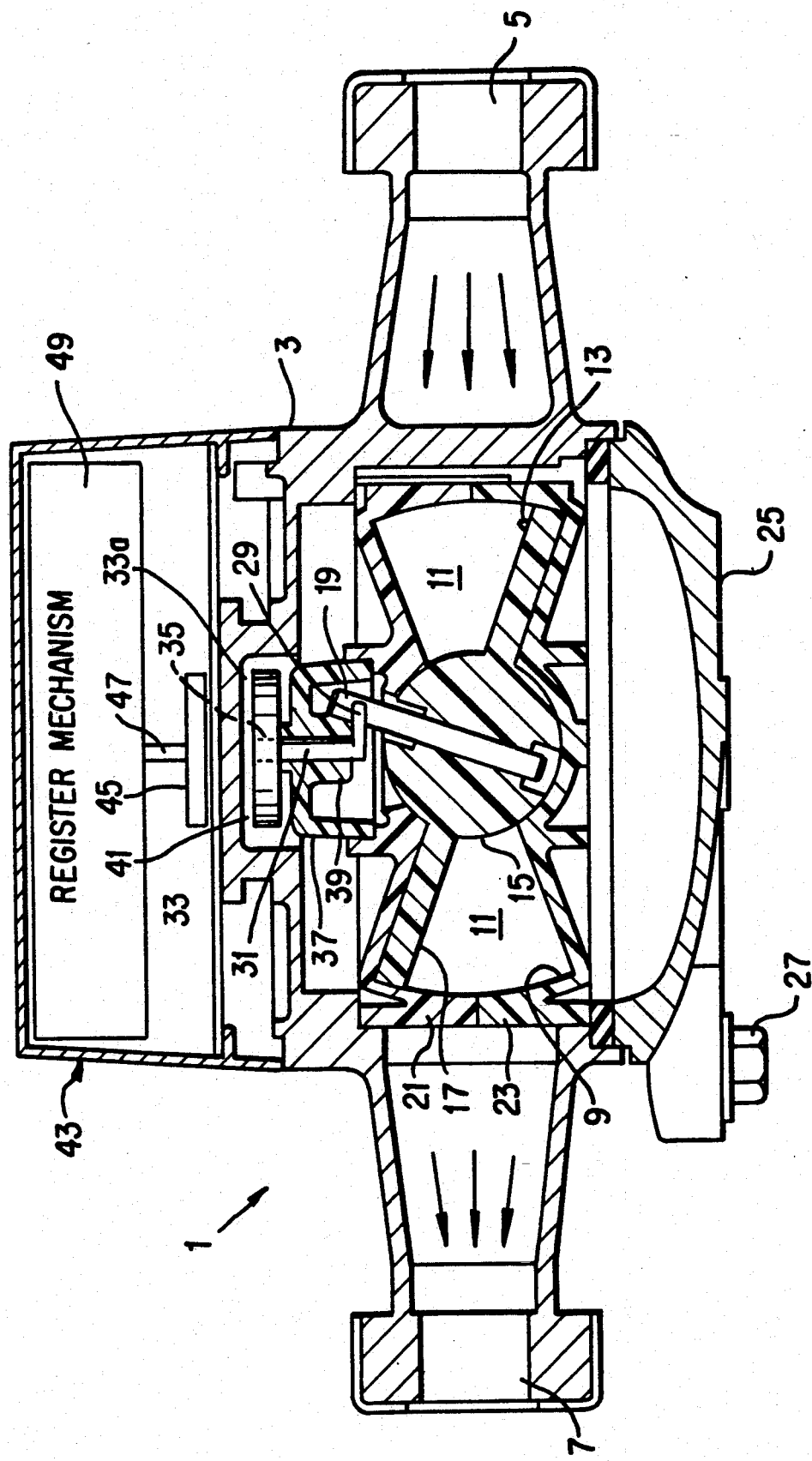
FIG. 1 is a cross-sectional side view of a water meter employing the improved drive shaft of the present invention.

FIG. 1 shows an overall view of a water meter 1 which is constructed in accordance with the principles of the present invention.

Water meter 1 includes a main meter casing or outer housing 3 formed from a non-ferrous material such as bronze or the like. Meter casing 3 includes an inlet 5 and an outlet 7. Disposed within the interior of meter casing 3 is a measuring chamber 9 which may be formed from a plastic or similar material. Measuring chamber 9 defines a precise and predetermined volume 11. Disposed within measuring chamber 9 is a nutating disk measuring element 13. Nutating disk 13 includes a central spherical bearing portion 15 and a disk portion 17.

A drive spindle 19 is attached at right angles to the center of nutating disk 13.

Measuring chamber 9 further includes inlet and outlet openings 21 and 23, respectively, to allow water flowing from inlet 5 into measuring chamber 9 and then out through chamber outlet 23 and meter outlet 7.

Meter casing 3 may further include a removable bottom cap 25 which may be attached to meter casing 3 through conventional means such as bolts 27.

As is apparent from FIG. 1, as water flows from either inlet 5, through measuring chamber 9 and through meter outlet 7, it causes nutating disk 13 to oscillate or nutate within measuring chamber 9. This, in turn, causes the free end of drive spindle 19 to move through a circular path.

This free end of drive spindle 19 engages an arm 29 formed at right angles to the longitudinal axis of a drive shaft 31. The other end of drive shaft 31 is connected to a circular magnet 33. Circular magnet 33 includes an opening 35 into which the end of drive shaft 31 is press-fitted.

Circular magnet 33 and drive shaft 31 are supported with respect to measuring chamber 9 and the free end of drive spindle 19 by means of a support cap 37 mounted to the top of measuring chamber 9. Support cap 37 includes an opening 39 for receiving drive shaft 31.

A face 33a of magnet 33 is disposed facing an inner portion 41 of meter casing 3. Mounted atop meter casing 3 is a meter register 43. Meter register 43 includes a complementary circular magnet 45 disposed opposite circular magnet 33. Because meter casing 3 is formed from a non-ferrous material, circular meter magnet 33 is magnetically coupled to the circular register magnet 45. As meter magnet 33 rotates, it causes register magnet 45 to also rotate. This causes register drive shaft 47 to turn and drive a conventional register mechanism 49 shown schematically in FIG. 1. Register mechanism 49 may be of the conventional mechanical dial and pointer and/or odometer display type. It may also include an electronic pulser or encoder mechanism, as is well known in the art.

The foregoing arrangements can be found in U.S. Pat. No. 3,002,266 and in product literature published by Schlumberger Industries, Inc. for the Neptune® T-10 model water meter.

Figure 2A:
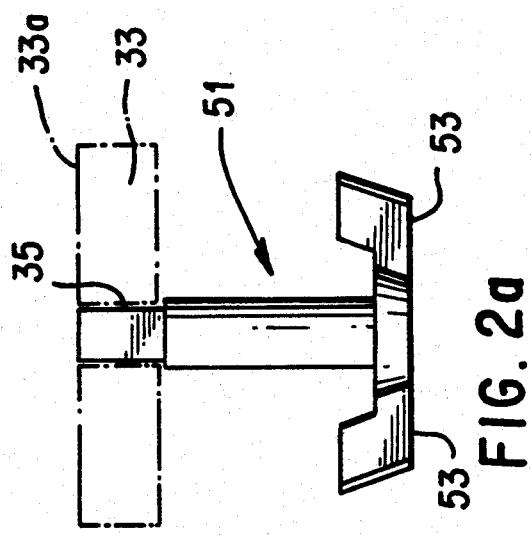
FIG. 2 shows various views of a prior art drive shaft design.
Figure 2B:
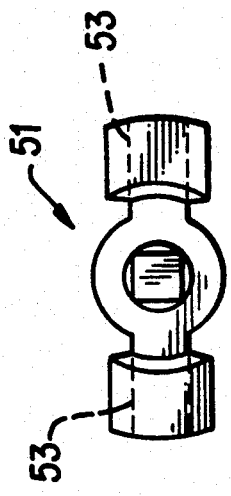

The present invention concerns an improved design for drive shaft 31 and its associated arm 29 which is less susceptible to breakage compared to prior art drive shaft designs. FIG. 2 shows a side and bottom view of a conventional prior art drive shaft 51. FIG. 2a shows the prior art drive shaft in side view, while FIG. 2b shows a bottom view of the same drive shaft. Drive shaft 51 includes a pair of rigid arms 53 formed at one end of drive shaft 51. These arms are designed to engage the free end of drive spindle 19. As drive spindle 19 oscillates in circular motion, it causes arms 53 and drive shaft 51 to rotate. The opposite end of drive shaft 51 is press fitted into opening 35 of meter magnet 33.

One severe drawback to such prior art drive shaft designs is that if the meter is subjected to freezing conditions the water which is always present between the upper portion 33a of magnet 33 and inner portion 41 of meter casing 3, meter magnet 33 can become frozen to the inner portion 41 of meter casing 3, thus preventing magnet 33 and drive shaft 31 from turning. However, water may still flow through meter 1 and measuring chamber 9, even though the upper portion of meter casing 3 may be cold enough to freeze. This can cause an excessive amount of force to be applied by the free end of meter spindle 19 against arm 53 of prior art drive shaft 51.

If a customer begins drawing water, it will flow through measuring chamber 9, causing nutating disk 13 to try to oscillate. The free end of drive spindle 19 will press with great force against one of the arms 53 of prior art drive shaft 51. If this pressure becomes too great, it may cause one or both arms 53 to be snapped or stripped off. Alternatively, the portion of prior art drive shaft 51 which is in contact with opening 35 in meter magnet 33 may become stripped or the pressure on opening 35 may become so great that it causes the material forming circular magnet 33, which is often of a brittle nature, to break or shatter.

The end result is that magnet 33 will no longer rotate in response to the oscillatory motion of drive spindle 19. This means that register magnet 45 will not rotate. Register mechanism 49 will therefore not register the amount of water flowing through meter 1.

Since many water utilities make meter readings only every two or three months, this represents a substantial loss of revenue on the part of the utilities. Once the problem is discovered, the meter must be taken out of service since it cannot be repaired while connected to a water line. The shutting down of service and meter repair can often be expensive and exceed the original cost of the meter itself.

Figure 3:
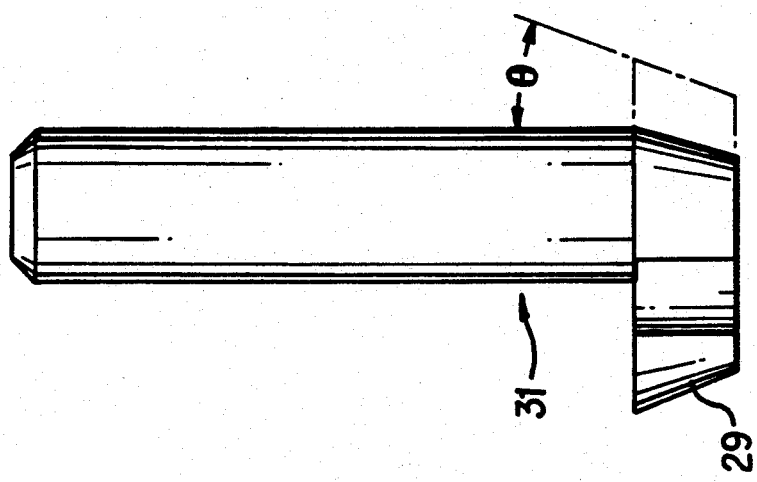
FIG. 3 is a side view of a drive shaft formed in accordance with the present invention.
Figure 4:
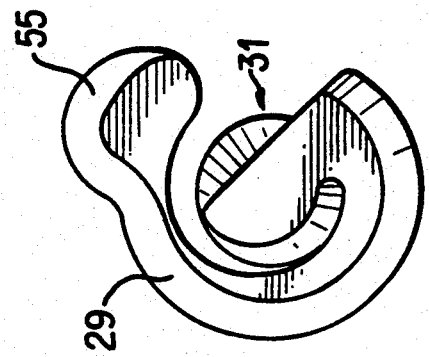
FIG. 4 is an end view of the improved drive shaft shown in FIG. 3.
Figure 5:
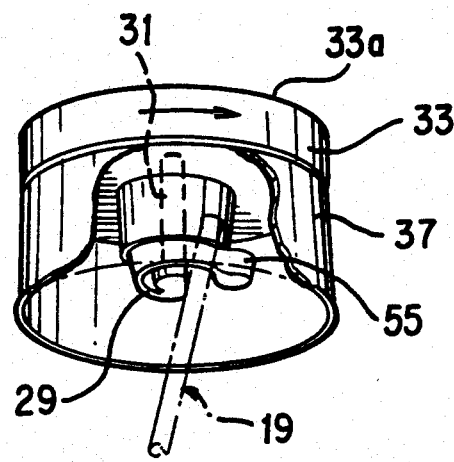
FIG. 5 is a perspective view of the drive shaft of the present invention showing its engagement with a conventional drive spindle of a nutating disk-type water meter and its associated magnetic coupling mechanism.

FIGS. 3, 4, and 5 show an improved drive shaft 31 which overcomes these drawbacks of conventional water meter drive shafts. Drive shaft 31 includes a springlike arm 29 formed at one end thereof. Arm 29 has a C- or spiral shape. The end of spring arm 29 which is radially distant from the longitudinal axis of drive shaft 31 includes a protrusion 55 which is designed to engage the free end of drive spindle 19 in normal operation.

As shown in FIG. 3, spring arm 29 is formed have a frusto-conical shaped cross section. Angle Θ is approximately equal to the angle the longitudinal axis of drive spindle 19 makes with respect to the longitudinal axis of drive shaft 31. Drive shaft 31 and spring arm 29 preferably are molded from a suitable plastic material, such as acetal.

In normal operation, the free end of drive spindle 19 bears against the outer surface of spring arm 29 and in contact with protrusion 55. The oscillatory motion of drive spindle 19 causes drive shaft 31 to rotate and drive the magnetic drive means comprised of meter magnet 33 and register magnet 47 which, in turn, drives register mechanism 49. In the event that meter magnet 33 should become frozen with respect to the inner portion 41 of meter casing 3, for example, due to the buildup of ice between these two parts, spring arm 29 will flex under pressure from drive spindle 19. When the force applied by drive spindle 19 against spring arm 29 and protrusion 55 exceeds a predetermined value, the free end of drive spindle 19 will slip or snap past protrusion 55 of spring arm 29, allowing drive spindle 19 to continue to move with relatively little interference. Once meter magnet 33 becomes unfrozen with respect to inner portion 41 of meter casing 3, the meter driving mechanism returns to normal. While a small quantity of water may not be metered during the time period while the meter magnet is frozen within meter casing 3, this is preferable to the situation which may occur with prior art mechanisms where the drive mechanism itself is permanently broken.

It will be appreciated that while the present invention has been described with respect to a nutating disk-type measuring element, the same principles may be applied to a water meter employing an oscillating piston-type positive displacement measurement element. Such oscillating piston measuring elements also include a drive spindle which moves in a small circular path in response to fluid flow through measuring chamber and past the oscillating piston. A drive shaft of the type described above may be used with little or no modification to engage a drive spindle of the oscillating piston.

While the present invention has been described in considerable detail, it will be apparent that various modifications and improvements may be made without departing from the spirit and scope of the invention as defined in the appended claims.

What is claimed is:

1. In a water meter of the type having an oscillatory positive displacement measuring element disposed in a chamber, the measuring element including a drive spindle coupled to means for magnetically driving a register, the improvement comprising:
   means for coupling the drive spindle to the magnetic drive means comprising:
   a drive shaft connected at one end to the magnetic drive means, the other end of the drive shaft including a flexible portion extending radially away from a longitudinal axis of the drive shaft;
   the drive spindle engaging the flexible portion of the drive shaft to turn the drive shaft magnetic drive means when the measuring element and drive spindle oscillate due to the passage of water through the chamber.

2. The water meter of claim 1, wherein the flexible portion of the drive shaft comprises a spiral shaped spring arm disposed at one end of the drive shaft.

3. The water meter of claim 1, wherein the flexible portion of the drive shaft includes a protrusion formed at one end thereof, to prevent slippage of the drive spindle past the flexible portion except when the force applied by the drive spindle to the flexible portion exceeds a predetermined value.

4. The water meter of claim 1, wherein the flexible portion takes the form of a flexible spring arm having a general C-shape, with one end of the spring arm connected to the drive shaft and the other end disposed radially away from the longitudinal axis of the drive shaft, said other end including a protrusion formed at its end to prevent slippage of the drive spindle past the spring arm except when the force applied by the drive spindle to the spring arm exceeds a predetermined value.

5. The water meter of claim 4 wherein the flexible spring arm has a generally frusto-conical shape in cross-section.

6. The water meter of claim 1, wherein the drive shaft and flexible portion are molded as a single piece from a plastic material.

7. A water meter comprising:
   a housing having an inlet and outlet;
   a measuring chamber defining a predetermined volume;
   a measuring element including a drive spindle arranged for oscillatory movement when water passes through the chamber; and
   a drive shaft having first and second ends, the first end being connected to magnetic drive means for magnetically driving a register mounted to the meter housing, the second end of the drive shaft including a flexible portion extending radially away from a longitudinal axis of the drive shaft and engaging the drive spindle, the flexible portion preventing slippage of the drive spindle past the flexible portion except when the force applied by the drive spindle to the flexible portion exceeds a predetermined value.

8. The water meter of claim 7, wherein the flexible portion of the drive shaft comprises a spiral shaped spring arm disposed at the second end of the drive shaft.

9. The water meter of claim 7, wherein the flexible portion of the drive shaft includes a protrusion formed at one end thereof, to prevent slippage of the drive spindle past the flexible portion except when the force applied by the drive spindle to the flexible portion exceeds a predetermined value.

10. The water meter of claim 7, wherein the flexible portion takes the form of a flexible spring arm having a general C-shape, with one end of the spring arm connected to the second end of the drive shaft and the other end disposed radially away from the longitudinal axis of the drive shaft, said other end of the spring arm including a protrusion formed at its end to prevent slippage of the drive spindle past the spring arm except when the force applied by the drive spindle to the spring arm exceeds a predetermined value.

11. The water meter of claim 10 wherein the flexible spring arm has a generally frusto-conical shape in cross-section.

12. The water meter of claim 7, wherein the drive shaft and flexible portion are molded as a single piece from a plastic material.

* * * * *